United States Patent [19]

Benjamin et al.

[11] Patent Number: 4,768,229
[45] Date of Patent: Aug. 30, 1988

[54] RESTRICTIVE ACCESS CONTROL SYSTEM

[75] Inventors: Lester F. Benjamin, Glenview; Gopalan Krishnamurthy, Hillside; Jouke N. Rypkema, Lombard, all of Ill.

[73] Assignee: Zenith Electronics Corporation, Glenview, Ill.

[21] Appl. No.: 887,311

[22] Filed: Jul. 21, 1986

[51] Int. Cl.⁴ .............................................. H04N 7/16
[52] U.S. Cl. ...................................... 380/20; 358/349
[58] Field of Search ............... 455/186, 26.1; 358/349; 380/20, 43

[56] References Cited

U.S. PATENT DOCUMENTS

| | | | |
|---|---|---|---|
| 3,975,585 | 8/1976 | Kirk, Jr. et al. | 380/20 |
| 4,161,751 | 7/1979 | Ost | 380/20 |
| 4,183,057 | 1/1980 | Sonnenberg | 358/349 |
| 4,268,859 | 5/1981 | Ost | 380/20 |
| 4,371,979 | 2/1983 | Vesterling | 358/349 |
| 4,410,911 | 10/1983 | Field et al. | 380/20 |
| 4,425,579 | 1/1984 | Merrell | 358/349 |
| 4,471,379 | 9/1984 | Stephens | 380/20 |
| 4,510,623 | 4/1985 | Bonneau et al. | 358/349 |
| 4,535,355 | 8/1985 | Arn et al. | 380/43 |
| 4,577,224 | 5/1986 | Ost | 380/20 |

*Primary Examiner*—Salvatore Cangialosi

[57] ABSTRACT

A restrictive access control system includes a 3-state switch for controlling the operating mode of the system and limiting tuning access to only designated channels. Tuning information is provided to a microprocessor via a control panel keyboard for storage in a nonvolatile memory and for subsequent recall therefrom when desired channel information is entered in the control panel by a viewer. In one embodiment, a 3-position key actuated switch has a first OFF position, a second PROGRAM position, and a third ON position. In the ON and OFF positions, the key may be removed from the switch while in the second PROGRAM position the key may not be removed from the switch. Programming of the nonvolatile memory may only be accomplished with the key in second PROGRAM position for storing either desired channels or locking out undesired channels. From the second PROGRAM position, the key may be turned to either the first OFF position for viewing all available channels or to the third ON position whereupon only authorized channels can be viewed. Turning the switch between the various positions, or modes of operation, is not possible without the key so as to provide a high level of viewing security, while affording the key bearer not only channel programming access, but also the capability of limiting tuning access to only designated channels. Other embodiments include (1) a two position key switch with key detector and limited access control selector and (2) program and limited access control selectors in combination with an optical card reader.

18 Claims, 4 Drawing Sheets

RESTRICTIVE ACCESS CONTROL SYSTEM

BACKGROUND OF THE INVENTION

This invention relates generally to restricting access to selected controls in a signal receiver and is particularly directed to a secure system for restricting tuning access to a limited number of designated channels in a satellite television receiver.

An increasing number of channels are being made available to the television viewer. This increase in television channel viewing availability is due to increasing numbers of cable television (CATV) networks as well as to the increasing use of satellites to relay transmitted television signals back to the earth. Such satellites are typically provided with antenna arrays which offer large areas of coverage of the surface of the earth. These communications satellites, which are in stationary orbit far above the earth's surface, are typically capable of re-transmitting as many as 24 channels. With the number of communications satellites now in use exceeding 20 and more scheduled for use in the near future, it can easily be seen that a television viewer may have in excess of 100 additional channels available for viewing.

Not all of these channels may be suitable for viewing by all members of the family. Thus, many parents would like to be able to limit viewing of their children to only programs suitable for a given age group. Various arrangements are currently available for providing limited viewing access.

One approach for limiting viewing access in a satellite television receiver makes use of a remote control transmitter which selectively disables the television receiver for preventing tuning to certain designated channels. Only designated channels may be tuned to using a television receiver-mounted channel selector when the remote controller is removed. This approach takes away a main convenience feature, i.e., remote control, is awkward to control, and thus has limited commercial appeal.

Another common approach to limiting channel viewing access involves the use of a password which is generally in the form of a multi-digit code word which either disables or enables the satellite television receiver in limiting channel viewing access as desired. One problem with this approach relates to the difficulty of remembering a multi-digit code. In some addressable systems, if the coded password is forgotten, a central controller must be contacted typically by telephone to allow for the entry of another password after the previously entered coded channel accessing entries are erased by the central controller. In order to avoid difficulties encountered when a password is forgotten, one current approach limits the effective time of an entered password to 12 hours. Following this predetermined time period, restricted access to any of the television channels is removed and all channels may be viewed. While limiting the inconvenience of a forgotten password to a predetermined period, this approach nevertheless requires user recall of the password over an extended time interval and requires reentry of a password every time limited channel viewing access is desired.

Still other restrictive access control systems allow for the entry of a new password if the previous password is forgotten. This approach can, of course, lead to abuses as any viewer can enter the new password and gain access, or restrict access, to any channel.

The present invention represents an improvement over the aforementioned approaches to restrictive access control systems by providing a key actuated 3-position control switch which affords three modes of operation for a satellite television receiver. One mode of operation permits all channels to be viewed, a second mode of operation permits selected channel access information to be stored in memory for subsequent recall, while a third mode of operation permits tuning to only those channels having authorized access information previously stored in memory. In the first and third modes of operation, the key can be removed from the 3-position switch to either permit all channels to be viewed or to provide only limited access to a predetermined number of channels. The present invention permits various satellites to be selectively accessed and precludes unauthorized satellite access by allowing for only authorized receiver antenna positioning control while also providing for only authorized channel viewing of selected channels of an authorized satellite.

While the invention will be explained hereinafter in terms of a restrictive access television viewing system, it is also applicable for restricting access to receiver functional controls other than channel selection, and especially to those controls subject to accidental misadjustment. For example, the restrictive access system of the invention may be applied to such receiver control functions as polarization angle of the received signal, polarity switching, tuning of audio subcarriers, etc.

OBJECTS OF THE INVENTION

Accordingly, it is a basic object of the present invention to provide an improved restrictive access system for use with selected controllable functions of a signal receiver.

It is a more specific object of the present invention to provide a programmable limited channel tuning system for a satellite television receiver.

It is another object of the present invention to restrict channel tuning access in a satellite television receiver to a limited number of designated channels.

Yet another object of the present invention is to provide a high level of security in a restricted channel accessing arrangement for a satellite television receiver.

A further object of the present invention is to provide a key actuated, multi-position switch arrangement for controlling the mode of operation of a television channel selector.

A still further object of the present invention is to control channel tuning access in a satellite television receiver by means of a keyswitch.

Still another object of the present invention is to limit channel viewing in a satellite television receiver to a selected satellite and to only a limited number of the channels of the selected satellite.

Another object of the present invention is to limit channel viewing in a satellite television receiver to only authorized channels by means of a 3-state status selector and access means arrangement.

A still further object of the present invention is to restrict viewer control over various parameters of the received signal.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF THE PREFERRED EMBODIMENT

Figure 1:
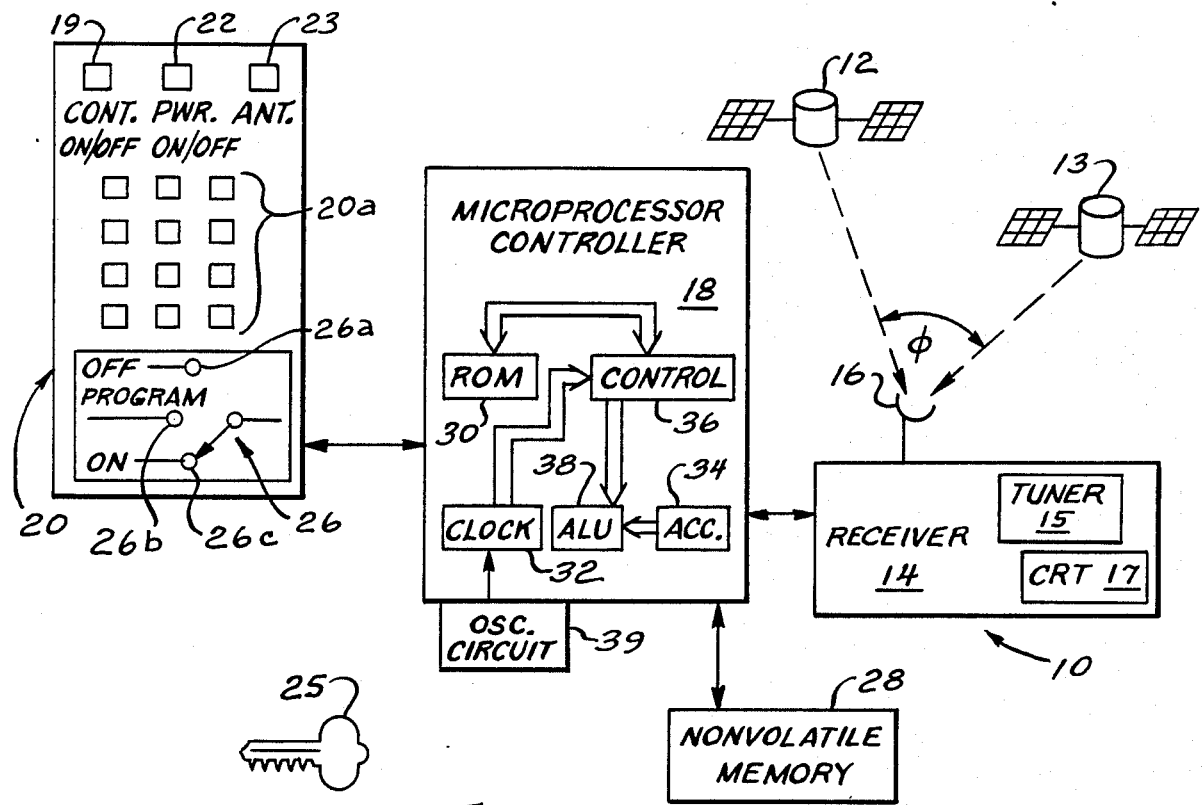
FIG. 1 is a combined simplified schematic and block diagram of a restrictive access control system for a television receiver in accordance with the present invention.

Referring to FIG. 1, there is shown in simplified block and schematic diagram form a restrictive access control system 10 in accordance with one embodiment of the present invention. While the restrictive access control system 10 of the present invention is described herein as used with a television receiver, it is not limited to this environment but could be used with virtually any multi-channel or frequency tunable signal receiver. The restrictive access control system 10 may be used to restrict access to any selected control of a signal receiver but is particularly adapted for providing access on a selective basis to designated channels in a communications network wherein FM modulated television signals are received via a satellite 12. The satellite 12 receives the television signals from an uplink (not shown) and retransmits the received television signals downward to the surface of the earth for reception by a satellite television receiver 14 which includes an antenna 16. The combination of the receiver 14 and dish-like antenna 16 are typically referred to as a satellite terminal. Other satellites 13 may also broadcast television signals in a downlink to earth for reception by the satellite television receiver 14. The receiver's antenna 16 typically must be rotated through a given angle $\phi$ to receive signals from different satellites due to its directivity. The present invention contemplates not only restricting viewing to only selected channels on an "as desired" basis, but also restricting or limiting the viewer's ability to change other satellite television receiver operating parameters including, but not limited to, its antenna pointing angle.

The receiver 14 includes a tuner 15 effectively tunable over the frequency band of the television signals retransmitted by the satellite 12 or 13. The television receiver's tuner 15 is responsive to control inputs from a microprocessor controller 18 which determines the frequency to which the tuner is to be tuned and thus the channel to be received. Microprocessor controlled tuning frequency or voltage synthesis wherein tunable analog circuitry within the tuner 15 is controlled by a microprocessor 18 is well known to those skilled in the art and this aspect of the present invention may be conventional in design and operation. A control panel 20, which may be either positioned on and integral with the satellite television receiver 14 or may be remotely located therefrom, includes a plurality of selector switches by means of which a user may provide various input commands to the microprocessor controller 18 in exercising control over the restrictive access control system 10. The microprocessor controller 18 is typically located within and is integral with the television receiver 14 although this is not shown in the fi9ure for illustrative purposes.

The microprocessor controller 18 may also be conventional in design, with the 8051 microprocessor utilized in a preferred embodiment. The microprocessor controller 18 includes a ROM 30, a clock 32, an accumulator 34, a controller 36, and an arithmetic and logic unit (ALU) 38. The microprocessor stores instructions and data, periodically updates the stored data, compares both stored and real-time data and makes decisions based upon these comparisons by means of logic instructions in providing system control. The ROM 30 is a nonvolatile, factory produced memory matrix which includes a plurality of memory locations or "bytes" of 8 bits each.

An oscillator circuit 39 external to the integrated circuit (IC) microprocessor controller 18 provides timing signals to the clock 32 for controlling the timing of operations carried out by the microprocessor. Program instructions and data are stored in the ROM 30. When the television receiver is turned on, the microprocessor program stored in the ROM 30 causes binary signals representing a first instruction stored in the ROM to be coupled to the microprocessor controller 36 and causes various other portions of the microprocessor controller 18 to be initialized for proper future operation. The ALU 38 receives binary control signals from the microprocessor controller 36 and performs the required arithmetic or logic operation.

User entries are made by means of the control panel 20 which is continually scanned by the microprocessor controller 18 for the detection of entries thereon. Since a preferred embodiment of the present invention is intended for programming as well as tuning a television receiver to only selected channels, such entries as the desired channel number may be entered by means of a keyboard 20a on the control panel 20. In the programming mode of operation, the microprocessor controller 18 receives this control information in the form of program timing instructions from the control panel 20 and writes this information into a nonvolatile memory 28 for storage therein. After these instructions are stored in the nonvolatile memory 28 by means of the microprocessor controller 18, real time information as provided by the microprocessor's oscillator circuit 40 and clock circuit 32 is used to read channel selection entries and to compare these entries with the contents of the nonvolatile memory 28 and to provide these control inputs to the tuner circuit 15 of the television receiver 14 when a valid comparison occurs. The nonvolatile memory 28 used in a preferred embodiment of the present invention is the 2817A Electrically Erasable Programmable Read Only Memory (EEPROM). The memory is programmed electrically in circuit and the data is retained even if power is removed and so does not require a battery backup.

The control panel 20 may include additional control switches such as a CONTROL ON/OFF selector 19, a POWER ON/OFF switch 22 and an ANTENNA switch 23 for controlling the orientation of the dish-like antenna 16 and thus the satellite to which it is directed. As in the case of the previously discussed selector controls on the control panel 20, the aforementioned control switches are continuously scanned by the microprocessor controller 18 for detecting user-initiated input commands. Some of the aforementioned control inputs may affect the operation of the restrictive access control system 10 of the present invention, while others do not. The manner in which these control inputs are processed by the microprocessor controller is discussed in detail below.

In accordance with the present invention, the control panel 20 includes a control switch comprised of a key actuated 3-position switch 26. With the key 25 inserted in the 3-position switch 26, the switch may be moved between three different positions which are indicated as contacts 26a, 26b and 26c. Positioning of the key actuated switch 26 in engagement with contact 26a represents a first, or OFF, mode of operation, while positioning of the switch in engagement with the second contact 26b represents a second, or PROGRAM, mode of operation. Finally, positioning of the switch in engagement with the third contact 26c corresponds to operation of the control switch in a third, or ON, mode of operation. The term "OFF" represents operation of the control panel 20 wherein all available television channels may be selected without restriction, while the term "ON" represents the operating mode of the control panel wherein only designated channels may be selected by means of the control panel. A detailed description of the operation of the selective viewing control system 10 of the present invention under the control of the microprocessor controller 18 in response to user initiated inputs provided via the control panel 20 is provided in the following paragraphs.

With the 3-position switch 26 in the OFF position wherein contact 26a is engaged, an appropriate signal is provided from the control panel 20 to the microprocessor controller 18 to allow digital data representing any channel number selected via the keyboard 20a to be processed in the microprocessor controller and to be provided to the tuner 15 within the television receiver 14. Thus, with the 3-position switch 26 in the OFF position, unrestricted channel tuning access is provided by the restrictive access control system 10. With the 3-position switch 26 in the ON position wherein contact 26c is engaged, the restrictive access control system 10 operates in a restricted channel tuning mode wherein only those channel numbers stored in the nonvolatile memory 28 with general access codes will be tuned to in response to user entries provided via the keyboard 20a. The 3-position switch 26 is freely displaceable between contacts 26a and 26c with the key 25 inserted therein.

The third mode of operation of the restrictive access control system 10 occurs when the 3-position switch 26 is in the PROGRAM mode of operation wherein contact 26b is engaged within the 3-position switch 26. In this mode of operation, channel number entries made via the keyboard 20a are provided to the microprocessor controller 18 and the microprocessor controller provides corresponding digital data words to the tuner 15 for tuning the television receiver 14 to a desired channel. More importantly, in this position free access or limited access conditions and other programming data entered via the keyboard 20a corresponding to the channel number selected are provided to the microprocessor controller 18 and are then written into nonvolatile memory 28. Again, the 3-position switch 26 is freely displaceable between the OFF and ON positions and the PROGRAM position when the key 25 is inserted therein. The key 25 may be removed from the 3-position switch 26 when the switch is in either the ON or OFF positions but may not be removed when the switch is in the PROGRAM position. This ensures that only the possessor of the key 25 has the capability to program the nonvolatile memory 28 with selected channel numbers for subsequent recall and tuning to of the television receiver 14. The 3-position key actuated switch 26 which allows the key to be removed with the switch only in predetermined positions may be conventional in design and operation and, as such, is well-known to those skilled in the art.

As indicated above, the status of the 3-position control switch 26 as well as the selection of various keys on the control panel's keyboard 20a may be provided in a conventional manner to the microprocessor controller 18. For example, the microprocessor controller 18 may provide various key and switch scanning signals to the control panel 20 for determining the status of the keys on the keyboard 20a as well as the status of the 3-position switch 26. Keyboard entries may then be processed by the microprocessor controller 18 in accordance with the status of the 3-position switch 26 with the microprocessor controller either tuning the television receiver 14 to the channel number entered, storing programming data for the entered channel number in the nonvolatile memory 28 for subsequent recall, or ignoring and not responding to the entered channel number with the 3-position switch 26 in the ON position and if the selected channel number has restricted access data stored in the nonvolatile memory.

Figure 2:
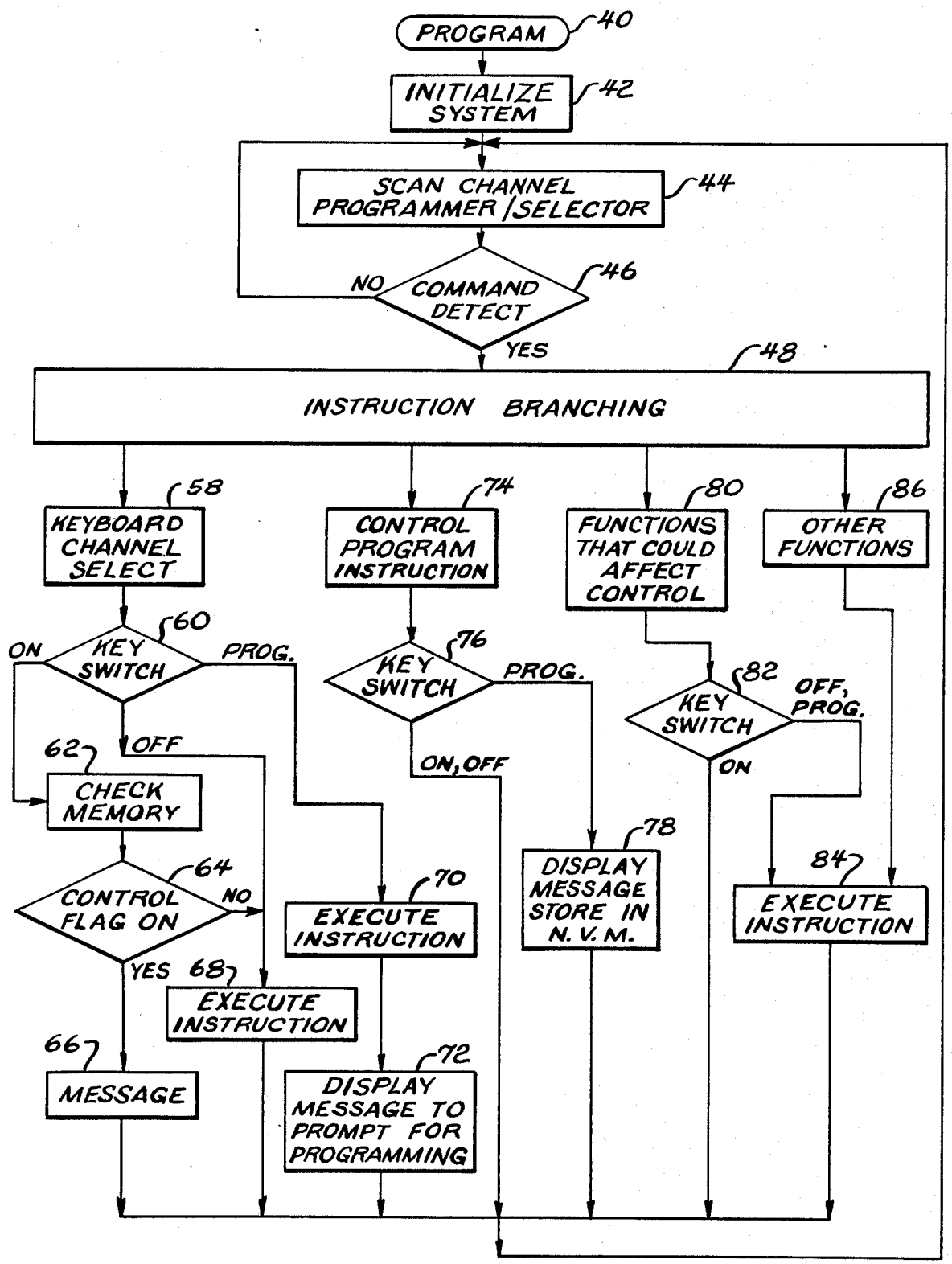
FIG. 2 is a flow chart illustrating the operation of the restrictive access control system of FIG. 1 under the control of a microprocessor.

Referring to FIG. 2, there is shown a flow chart illustrating the operation of the restrictive access control system 10 of the present invention under the control of the microprocessor controller 18. In FIG. 2, an oval symbol indicates the start of an operational sequence, a rectangle indicates an instruction or set of instructions resulting in the performance of a control function, and a diamond indicates a decision based upon the comparison of binary signals within the microprocessor controller 18.

At step 40 in the operation of the program stored in the microprocessor controller 18, the program for either storing data for a selected channel number in the nonvolatile memory or recalling a number therefrom for tuning the television receiver 14 to the selected channel number is initiated. At step 42, the microprocessor controller 18 is initialized by resetting its control flags to an initial set of conditions whereupon the microprocessor controller is ready for controlling the selective viewing control system 10 in accordance with the present invention. The microprocessor controller 18 initially outputs scanning signals to the control panel 20 in order to detect engagement of one of the keys on the keyboard 20a as well as the status of the 3-position switch 26 as shown at step 44. The program stored in the microprocessor controller 18 causes the microprocessor controller to continuously scan the control panel 20 until a user-initiated input command is detected at step 46. Upon detection of an input command, the program then at step 48 executes an instruction branching routine in accordance with the user-initiated control input provided to the control panel 20. If in the instruction branching routine at step 48 the program determines that a channel number has been selected on the keyboard 20a, the program then determines which key, or keys, has been selected at step 58.

The program then detects the status of the 3-position control switch 26 at step 60. The 3-position control switch 26 may be in either the ON, OFF or the PROGRAM position with the program then executing an appropriate branching instruction at step 60 in accordance with the status or position of the 3-position switch as shown in FIG. 2.

If the 3-position switch 26 is in the ON position, the program branches from step 60 to step 62 in order to check the contents of the nonvolatile memory 28. This nonvolatile memory check involves the comparison within the microprocessor controller 18 of the keyboard entry input and the data stored in the nonvolatile memory 28 for that channel number. Based upon the results of this comparison, a control flag will be either set or not set at step 64. A valid comparison at step 64 causes a control flag in the program not to be set and the program branches to step 68 and executes the instruction by providing an appropriate signal corresponding to the selected channel number to the tuner 15 for tuning the television receiver 14 to the selected channel. Therefore, in this sequence of events the program stored in the microprocessor controller 18 has determined that the 3-position switch 26 is in the ON position indicating that the restrictive access control system 10 is in the restricted channel viewing mode of operation and has further determined that the selected channel number corresponds to one of the authorized channel numbers which has been stored in the nonvolatile memory 28 and has therefore tuned the television receiver 14 to the selected channel number.

If at step 64 it is determined that the control flag is on indicating limited access data stored in the nonvolatile memory 28 corresponding to the channel number entered, the program proceeds to step 66 and provides a visual display on the receiver's CRT 17 that the selected channel is not an authorized channel number for viewing. Following presentation of this visual display on the CRT 17 that an unauthorized channel number has been selected at step 66 or the tuning to an authorized selected channel number at step 68, the program returns to the continuous scanning of the control panel 20 at step 44.

If at step 60, it is determined that the 3-position control switch 26 is in the OFF position, indicating that the restrictive access control system 10 is not in the restricted channel tuning mode of operation, the program proceeds to step 68 and executes the user-initiated input command by providing appropriate tuning data to the tuner 15 for tuning the television receiver 14 to the selected channel number. Following execution of this instruction at step 58 and tuning the television receiver 14 to the selected channel number, the program returns to step 44 and re-initiates the continuous scanning of the keyboard 20a of the control panel 20 for detecting subsequent user-initiated input commands.

If at step 60, the program determines that the 3-position switch 26 is in the PROGRAM position, the program proceeds to execute the instruction at step 70 whereby the television receiver 14 is tuned to the channel number entered on the keyboard 20a. Following tuning of the television receiver 14 to the thus entered channel number, the program proceeds to step 72 and provides a visual display on the CRT 17 indicating whether or not the selected and tuned to channel number is an authorized channel number as determined by the data stored in the nonvolatile memory 28 for that channel. If for the selected channel number a general access condition is stored in the nonvolatile memory 28, the program will cause to be displayed on the CRT 17 an indication that the selected channel number is an authorized channel number. On the other hand, if for the selected channel number a limited access condition was stored in the nonvolatile memory 28, the program at step 72 will provide a visual indication on the CRT 17 that the tuned to channel is not an authorized channel.

If in the instruction branching routine at step 48, selection of the CONTROL ON/OFF switch 19 is detected, the program proceeds to step 74 for executing the control program instruction subroutine at step 74. The first step in the control program instruction subroutine involves determining the status of the 3-position key switch at step 76. If the 3-position key switch 26 is in either the ON or OFF position, the program branches to step 44 and again scans the control panel 20 for detecting any user-initiated inputs thereto. If at step 76, it is determined that the 3-position key switch 26 is in the PROGRAM position, the program proceeds to step 78 and stores the new access condition for the entered channel number in the nonvolatile memory 28 and provides a visual display on the CRT 17 indicating whether or not the selected channel number was authorized as per data stored in the nonvolatile memory. By toggling the CONTROL ON/OFF selector 19 the user can determine if the selected channel number has been authorized as per data stored in the nonvolatile memory 28 and can also change the authorization condition by storing the new condition in the nonvolatile memory for the selected channel number. Following display of the status of the selected channel number and its storage in the nonvolatile memory 28 at step 78, the program returns to step 44 and again scans the control panel 20 in order to detect user-initiated control inputs thereto.

If in the instruction branching subroutine at step 48, the program detects selection of a control function that could affect control of the restrictive access control system, such as the antenna selector 23, the program proceeds to step 80 for executing the subroutine called out by the control input thus selected. The antenna selector 23 is taken only as an example of some of the various functions that could be selected in a typical satellite television receiver which may have an impact upon the status of the restrictive access control system of the present invention. For example, manipulation of the antenna pointing angle by means of antenna selector 23, which is typically provided for in satellite television receivers, could defeat the restricted television channel viewing operation of the restrictive access control system of the present invention. Therefore, the position of the 3-position key switch 26 is determined at step 82 following selection on the control panel 20 of a function which could affect the restrictive access control system. If at step 82 it is determined that the 3-position key switch is in the ON position indicating that the system is in the restricted channel viewing mode of operation, the program ignores this user-initiated control input and returns to step 44 and again scans the control panel 20 for detection of the next control input. If the 3-position control switch 26 is detected at step 82 as being in either the OFF or PROGRAM position corresponding to the unrestricted channel viewing mode of operation of the restrictive access control system, the program executes the instruction provided by the user-initiated control input at step 84 and then returns to step 44 for again scanning the channel program/selector 20 in order to detect the next control input.

Other functions may be available on the control panel 20 which do not affect the operation of the restrictive access control system. For example, a POWER ON/OFF selector 22 may be selected as detected in the instructional branching routine 48 causing the program to execute another function routine at step 86. After selection of one of these other functions, of which the POWER ON/OFF selector is only one example, the program executes this instruction at step 84 and then returns to the control panel scanning mode of operation at step 44.

Figure 3:
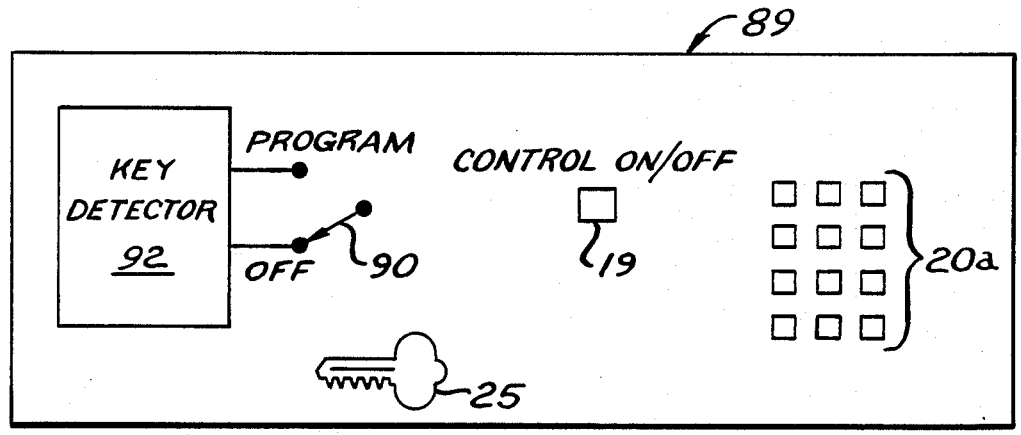
FIG. 3 is a simplified schematic diagram of another embodiment of the present invention involving the use of a two-position key actuated switch with key detector and a mode control selector.

Referring to FIG. 3, there is shown another embodiment of a control panel 89 for use in the restrictive access control system of the present invention. The control panel 89 includes a keyboard 20a having a plurality of user responsive keys for selecting a given channel number. This may also be accomplished by means of a channel up/down selector (not shown) as described below. The control panel 89 further includes a 2-position switch 90 responsive to a key 25 inserted therein. The 2-position switch 90 has a PROGRAM position and an OFF position. The key 25 may only be removed from the 2-position switch 90 when the switch is in the OFF position. Individual television channels as well as the channels of a particular satellite may only be authorized for viewing or removed from authorized viewing access when the key 25 is inserted in the 2-position switch 90 and the switch is in the PROGRAM position. A key detector circuit 92 is coupled to the 2-position switch 90 for detecting when the key 25 is inserted in the switch. With the 2-position switch 90 in the OFF position and the key 25 removed therefrom, only those channel numbers which have been authorized for viewing in the nonvolatile memory may be viewed. With the key 25 inserted in the 2-position switch 90 and the switch in the OFF position, the key detector circuit 92 inhibits the limited channel viewing state and allows all available channels to be selected and viewed by providing appropriate control signals to the microprocessor controller. Therefore, the OFF position of the 2-position switch 90 with the key removed therefrom corresponds to the ON position of the 3-position switch 26 illustrated in FIG. 1. Similarly, the OFF position of the 2-position switch 90 with the key 25 inserted therein corresponds to the OFF position of the 3-position switch 26 of FIG. 1 wherein all channels are available for viewing. The third state of the 2-position switch 90 occurs when the switch is in the PROGRAM position wherein various channels as well as the channels of various satellites may be authorized or deauthorized for viewing by operation of the control ON/OFF selector 19 as previously described with respect to FIG. 1. Thus, with the 2-position switch 90 in the PROGRAM position, various channel numbers may be entered via the keyboard 20a and a channel number may be authorized for viewing by the storage of appropriate data in the nonvolatile memory by positioning the control ON/OFF selector 19 in the ON position. Similarly, an entered channel number may be removed from those channel numbers authorized for viewing by positioning of the control ON/OFF selector 19 in the OFF position in order to remove the viewing authorization data previously stored in the nonvolatile memory. The key detector circuit 92 may be conventional in design and operation and thus is not described in further detail herein.

Figure 4:
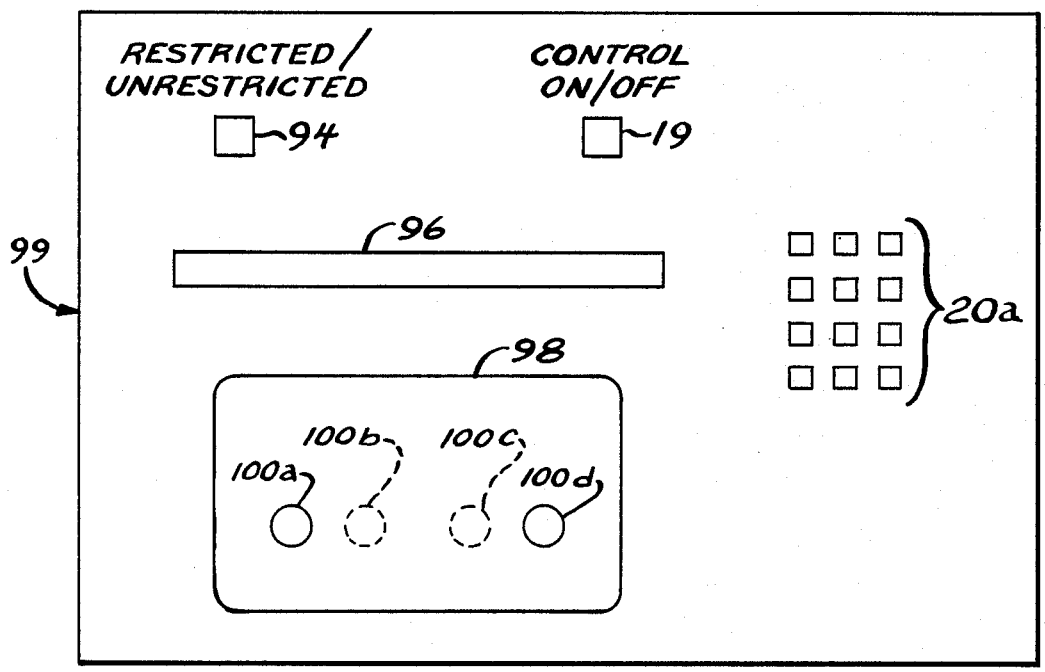
FIG. 4 is a simplified schematic diagram of yet another embodiment of the present invention involving the use of an optical card reader in combination with programming and mode select switches.
Figure 5:
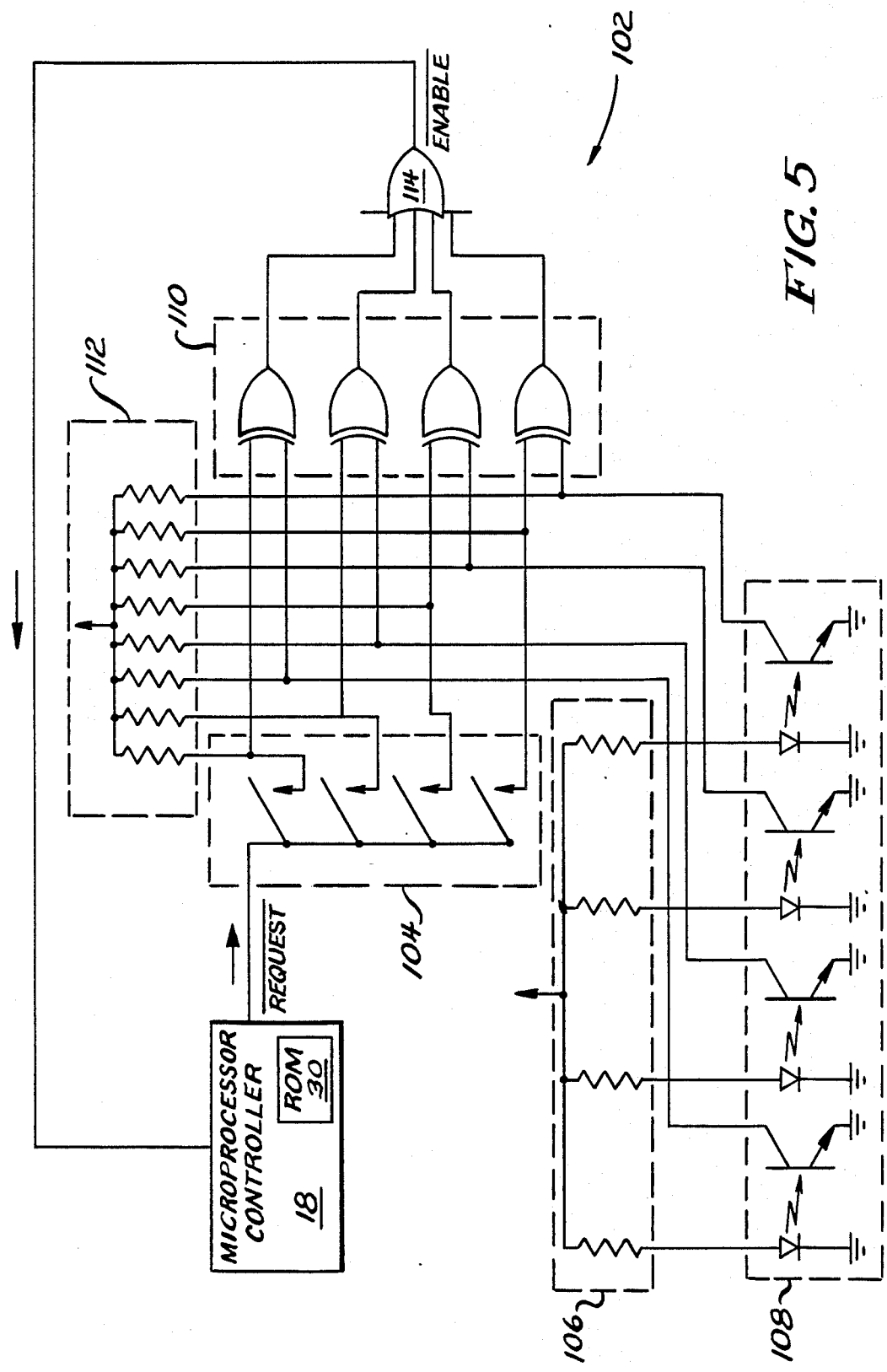
FIG. 5 is a schematic diagram of an optical decoder for use in the optical card reader in the embodiment of the present invention illustrated in FIG. 4.

Referring to FIG. 4, there is shown yet another 3-state switch arrangement for use in the restrictive access control system of the present invention. The control panel 99 of FIG. 4 includes a restricted/unrestricted toggle switch 94, the aforementioned control ON/OFF selector 19, the aforementioned keyboard 20a, and a slot 96 for receiving an optically coded card 98. The optically coded card 98 includes a plurality of code spaces 100a through 100d. Each card 98 may be uniquely coded for a given user by punching out or removing various combinations of the coded spaces. For example, in the card 98 illustrated in the figure, the left and right hand coded spaces 100a, 100d have been removed from the card, while the inner spaces 100b, 100c have been left intact. By selectively removing various combinations of the aforementioned coded spaces, each optically coded card may be uniquely matched with a given viewer. While the card 98 is shown with four coded spaces, the present invention is not limited to this number of user codes but may make use of virtually any number of user codes. With the optically coded viewer card 98 inserted in the slot 96 in the control panel 99, an optical card reader 102 as illustrated in FIG. 5 and described below is used to control the operating state of the restrictive access control system.

The optical card reader 102 is coupled to the microprocessor controller 18 and is responsive to a $\overline{\text{REQUEST}}$ output signal generated by the software program stored in the controller's ROM 30. The optical card reader 102 includes a plurality of mechanical switches 104 which are coupled to the microprocessor controller 18 and responsive to the $\overline{\text{REQUEST}}$ signal output therefrom. The state of each of the mechanical switches 104 (closed or open) may be established as desired and represents the unique address identifier for a given restrictive access control system. The optical card reader 102 further includes a plurality of paired photodiodes/phototransistors 108. Each of the photodiodes is coupled to one of a respective plurality of biasing resistors 106.

With the viewer card 98 inserted in the slot 96, optical communication will be established between various combinations of the paired photodiodes and phototransistors. Each phototransistor is coupled to one of a plurality of Exclusive OR gates 110 and provides a respective input thereto when a coded aperture in the viewer card 98 is positioned between a respective photodiode and phototransistor pair. Similarly, the mechanical switches 104 are coupled to the Exclusive OR gates 110 and, when closed, provide the $\overline{\text{REQUEST}}$ signal to one input of a respective gate. A plurality of pull-up resistors 112 are each coupled between a respective mechanical switch and an Exclusive OR gate coupled thereto. An Exclusive OR gate will provide an output to an OR gate 114 coupled thereto when there is a mismatch between the inputs provided thereto. For example, if the $\overline{\text{REQUEST}}$ signal is provided via one of the mechanical switches 104 to one input of an Exclusive OR gate and its associated phototransistor does not provide an input thereto indicating the absence of a coded aperture between the photodiode and phototransistor, that Exclusive OR gate will provide a high output to the OR gate 114. Receipt by the OR gate 114 of any high inputs from the Exclusive OR gates 110 will result in a high output from the OR gate corresponding to an $\overline{\text{ENABLE}}$ signal which is provided back to the microprocessor controller 18 for disabling or deactivating the satellite viewing control system. Thus, upon detection of a mismatch between the state of the mechanical switches 104 and the coded apertures on the optically coded viewer card 98 as detected by the photodiode/phototransistors 108, an $\overline{\text{ENABLE}}$ signal is provided from the OR gate 114 to the microprocessor controller 18 for rendering the restrictive access control system unresponsive to inputs provided from the control panel 99.

If there is a match between the state of the various mechanical switches 104 and coded apertures in the viewer card 98, OR gate 114 will provide a low $\overline{\text{ENABLE}}$ signal to the microprocessor controller 18 for rendering the satellite viewing control system responsive to viewer inputs provided via the control panel 99. Thus, with an authorized viewer card 98 positioned within the slot 96, the status of the restrictive access control system may be changed from restricted to unrestricted viewing, or vice versa, by toggling of the RESTRICTED/UNRESTRICTED selector 94. When the authorized viewer card 98 is removed from the slot 96, the restrictive access control system will remain in the state last selected by the RESTRICTED/UNRESTRICTED selector 94. In addition, with an authorized viewer card 98 inserted in the slot 96, selected channel authorization data may be either stored in or removed from the nonvolatile memory by alternating engagement of the control ON/OFF selector 19 as previously described. Therefore, the 3-state switch arrangement of the restrictive access control system illustrated in FIG. 4 is comprised of the RESTRICTED/UNRESTRICTED selector 94 in combination with an optically coded viewer card 98 inserted within the slot 96 to permit the optical code thereon to be read by the optical card reader 102 of FIG. 5.

Figure 6:
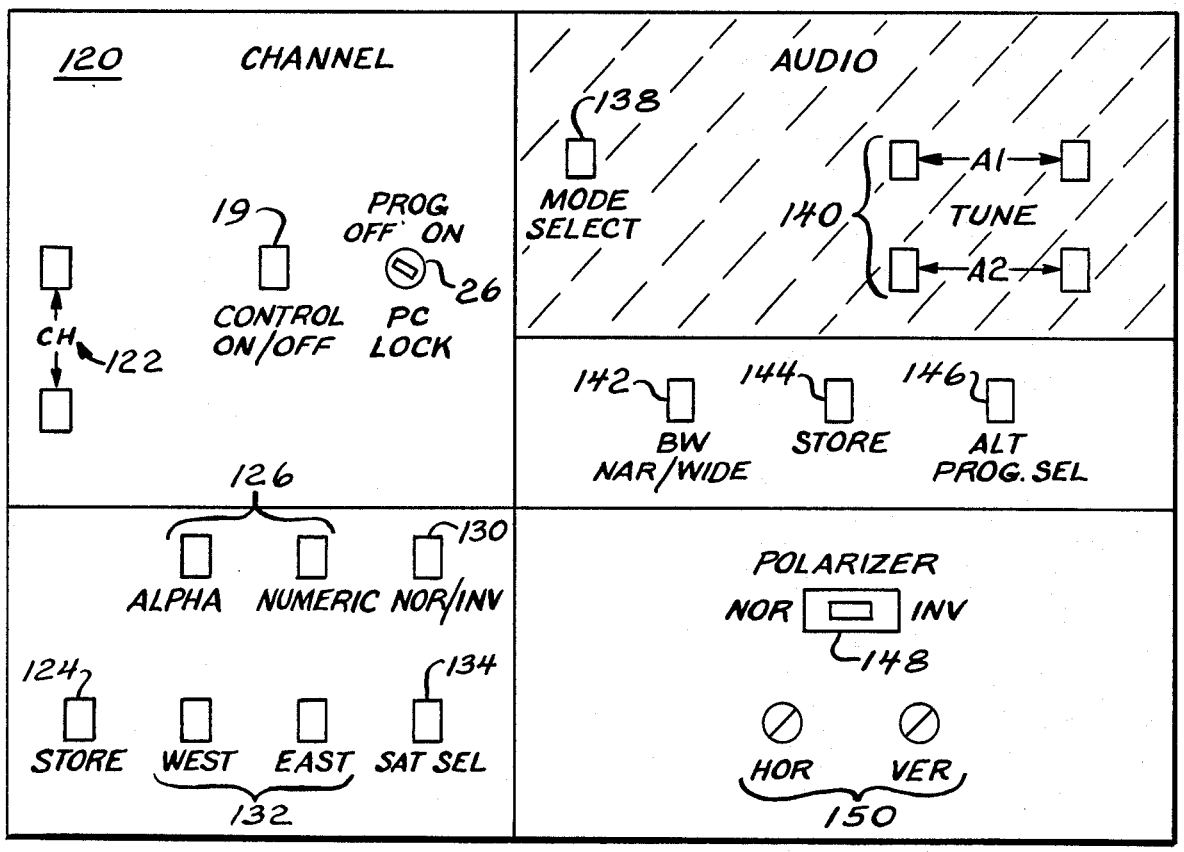
FIG. 6 is a simplified schematic diagram of another embodiment of a control panel for use in the restrictive access control system of the present invention.

Referring to FIG. 6, there is shown a complete satellite control panel 120 for use in the restrictive access control system of the present invention. In the channel selection and authorized accessing portion of the satellite control panel 120 there is included the aforementioned control ON/OFF selector 19 as well as the 3-position key switch 26. Rather than the aforementioned multi-selector keyboard arrangement, the satellite control panel 120 includes a channel UP/DOWN selector 122 for sequentially selecting various channels as well as storing or removing tuning authorization data from the nonvolatile memory as described previously. Satellite antenna controls provided for in the satellite control panel 120 include a satellite antenna position store selector 124 for storing the present antenna position in memory. In addition, a given satellite may be selected either by a satellite cycling selector 134 wherein the various satellites are cycled through in a sequential manner or by means of a pair of satellite selectors 126. The pair of satellite selectors 126 include alpha and numeric selecting keys for generating the alpha numeric identifying code name of a desired satellite. An antenna polarization selector 130 is also provided for selecting between normal and inverted antenna polarization. Finally, antenna position is controlled by means of an antenna displacement control 132 which permits the satellite antenna to be displaced as desired for alignment with a given satellite.

Audio controls include a mode selector 138 for selecting between mono, stereo discrete and stereo matrix modes of operation. An audio subcarrier selector 140 is also provided for selecting two audio subcarriers which are used for the satellite television channel. An audio subcarrier bandwidth selector 142 permits the viewer to select between narrow and wide bandwidths, while a store selector 144 permits the selected audio subcarrier to be stored in memory. In addition, an alternate program selector 146 permits those channels having associated viewing authorization data stored in the nonvolatile memory to be cycled through in a sequential manner for viewer selection. A polarizer selector 148 permits the satellite television receiver to be tuned to either normal or inverted polarized signals, while polarization fine tune controls 150 permit the receiver to be fine tuned to the polarization of the received signals.

There has thus been shown a restrictive access control system utilizing a 3-state switch arrangement which provides for unrestricted channel viewing in one state, restricted channel viewing in a second state, and for either authorizing or deleting authorization for viewing selected channels in a third state. In one embodiment, the system includes a 3-position key actuated switch which provides the various modes of operation in tuning a television receiver to selected channel numbers. In a PROGRAM mode of operation, the key actuated switch permits authorization data as selected by a control ON/OFF key to be stored by a microprocessor controller in a nonvolatile memory for authorized channels. In the OFF position, the key actuated switch permits the television receiver to be tuned to any selected channel number, while in the ON position the key actuated switch restricts tuning of the television receiver to only those channel numbers which have previously been authorized as per data stored in the nonvolatile memory. The key may be removed from the 3-position switch when it is in either the ON or OFF positions to prevent unauthorized accessing of the nonvolatile memory and the tuning to unprogrammed channel numbers. Other embodiments of the 3-state switch arrangement include a two-position key actuated switch with key detection as well as an optical card reader for detecting a programming authorization code. The restrictive access control system is particularly adapted for use with a satellite television receiver where it is desired to restrict tuning access to only designated satellites and to a limited number of channels in these designated satellites.

While particular embodiments of the present invention have been shown and described, it will be obvious to those skilled in the art that changes and modifications may be made without departing from the invention in its broader aspects. For example, while the present invention has been described in terms of providing selective viewing control for a satellite television receiver, it has equal application and may as easily be incorporated in a conventional television receiver for restricting tuning access to only authorized channels. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a satellite receiver having a dish-like movable antenna and including user-responsive selector means and a tuner wherein user commands to said selector means representing a plurality of site specific receiver operating parameters and selected channel number data are provided to said receiver and tuner for tuning said satellite receiver to a selected channel, a restrictive access control system for limiting signal receiver tuning to only authorized channels, said system comprising:

memory means for storing selected ones of said plurality of site specific receiver operating parameters and selected channel number data;

viewer responsive 3-state switch means characterized by a first state wherein all channels may be viewed, a second state wherein only authorized channels may be viewed, and a third state for designating authorized channels for viewing in said second state, said 3-state switch means including authorization means for preventing transition of said switch means to either said first state or said third state from said second state except when authorized by a user; and controller means coupled to said selector means, said 3-state switch means, said memory means and to said receiver for providing said selected ones of said plurality of site specific receiver operating parameters and data representing a selected channel number to the receiver and tuner for tuning to a selected channel when said switch means is in said first state, for providing said selected ones of said plurality of site specific receiver operating parameters and data representing an authorized channel number to said memory means for storage therein when said switch means is in said third state, and for reading from said memory means said selected ones of said plurality of site specific receiver operating parameters and authorized channel number data stored therein and for providing said selected ones of said plurality of site specific receiver operating parameters and authorized channel number data to said receiver and tuner in tuning said signal receiver to an authorized channel when said switch means is in said second state.

2. The control system of claim 1 wherein said selector means includes a multi-switch keyboard.

3. The control system of claim 1 wherein the satellite receiver includes video display means and wherein said controller means provides an invalid comparison signal thereto for providing a visual indication that the selected channel number is not stored in said memory means and that the satellite receiver will not be tuned to the selected channel number.

4. The control system of claim 3 wherein said selector means includes a channel number selector and wherein said controller means alternately stores in and removes from said memory means data representing an authorized channel number with each successive engagement of said channel number selector when said 3-state switch is in said third state.

5. The control system of claim 1 further comprising a mode control switch coupled to said controller means, wherein a selected channel number can only be stored in said memory means with said mode control switch engaged.

6. The control system of claim 1 wherein said system limits signal receiver tuning to only authorized channels of designated satellites.

7. The control system of claim 6 wherein said selector means includes antenna position selector means for changing the pointing angle of said antenna relative to various satellites and wherein said controller means further stores data representing a selected satellite pointing angle in said memory means for subsequent recall and tuning to authorized channels of said selected satellite.

8. The control system of claim 6 wherein said selector means includes signal polarization selector means for selecting the polarization of the received signal.

9. The control system of claim 6 wherein said selector means includes user responsive signal storage means coupled to said controller means for storing satellite signal parameters characteristic of authorized channels.

10. The control system of claim 1 wherein said 3-state switch means comprises a 3-position key actuated switch having first, second and third positions corresponding respectively to said first, second and third states and wherein said authorization means comprises a key for actuating said 3-position switch.

11. The control system of claim 10 further comprising means for preventing removal of said key from said 3-position switch when said switch is in the third position.

12. The control system of claim 1 wherein said 3-state switch means comprises a 2-position key actuated switch in combination with key detection means for detecting the presence of a key in said 2-position switch and wherein said authorization means comprises a key.

13. The control system of claim 12 wherein said first, second and third states respectively correspond to the 2-position switch in a first position with said key inserted therein, the 2-position switch in said first position with said key removed therefrom, and the 2-position switch in a second position with said key inserted therein.

14. The control system of claim 1 wherein said 3-state switch means comprises in combination an optical card reader having a predetermined code stored therein and responsive to a coded card inserted therein and a viewing access selector means for rendering said system in a restricted or unrestricted viewing access mode of operation, wherein said viewing access selector means is responsive to and rendered operative by the coded card inserted in the optical card reader when the code of said card matches the code stored in said optical card reader.

15. The control system of claim 14 wherein said first, second and third states respectively correspond to said viewing access selector means in a first state and card inserted in said optical card reader with the code of said card matching the code stored in said optical card reader, said viewing access selector means in a second state and said coded card withdrawn from said optical card reader, and said viewing access selector means in said second state and said card inserted in said optical card reader with the code of said card matching the code stored in said optical card reader.

16. The control system of claim 1 wherein said signal receiver includes a plurality of controllable functions, said control system further comprising means for enabling operation of selected ones of said controllable functions only when said switch means is in said third state.

17. The control system of claim 16 wherein said satellite receiver is in a satellite terminal and comprises a television receiver for receiving television signals transmitted by satellite.

18. In a satellite receiver having a dish-like movable antenna and including user-responsive selector means and a tuner wherein user commands to said selector means representing selected channel number data are provided to said tuner for tuning said satellite receiver to a selected channel, said signal receiver further including a plurality of site specific controllable functions, a restrictive access control system for limiting signal receiver tuning to only authorized channels and for limiting control over said signal receiver, said system comprising:

memory means for storing selected channel number and site specific receiver controllable functions data;

viewer responsive 3-state switch means characterized by a first state wherein all channels may be viewed, a second state wherein only authorized channels may be viewed, and a third state for designating authorized channels for viewing in said second state, said 3-state switch means including authorization means for preventing transition of said switch means to either said first state or said third state from said second state except when authorized by a user;

controller means coupled to said selector means, said 3-state switch means, said memory means and to said receiver for providing data representing a plurality of selected site specific receiver controllable functions and a selected channel number to the receiver and tuner for tuning to a selected channel when said switch means is in said first state, for providing data representing a plurality of authorized receiver controllable functions and an authorized channel number to said memory means for storage therein when said switch means is in said third state, and for reading from said memory means said plurality of authorized receiver controllable functions and authorized channel number data stored therein and for providing said plurality of authorized receiver controllable functions and authorized channel number data to said receiver and tuner in tuning said signal receiver to an authorized channel when said switch means is in said second state; and means for enabling operation of selected ones of said plurality of site specific receiver controllable functions only when said switch means is in said third state.

\* \* \* \* \*